UNITED STATES PATENT OFFICE.

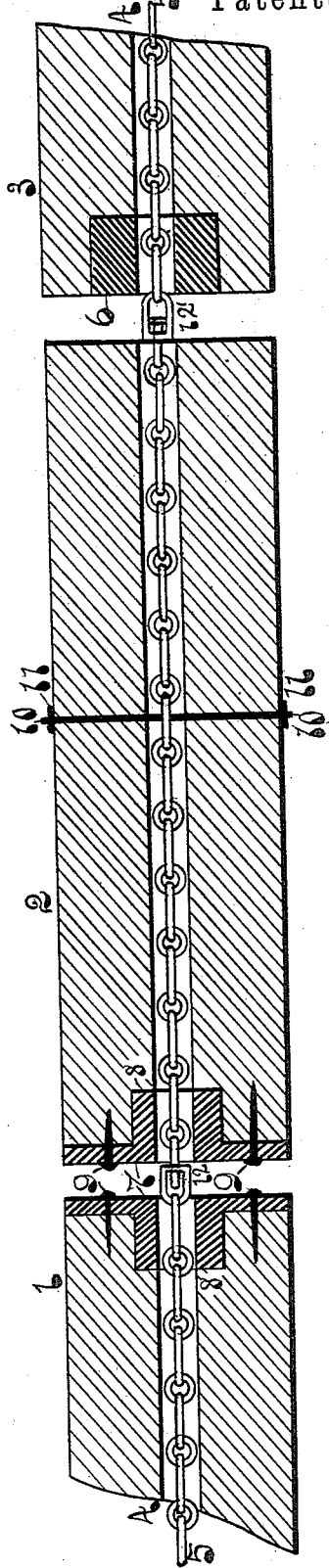

BENJAMIN BOUTELL, OF BAY CITY, MICHIGAN.

BOOM.

SPECIFICATION forming part of Letters Patent No. 359,765, dated March 22, 1887.

Application filed November 6, 1886. Serial No. 218,191. (No model.)

*To all whom it may concern:*

Be it known that I, BENJAMIN BOUTELL, of Bay City, in the county of Bay and State of Michigan, have invented a new and useful Improvement in Booms, of which the following is a specification.

My invention consists of an improvement in booms, hereinafter described and pointed out.

The drawing is a vertical section through one boom-log and parts of two others.

In towing logs it is necessary that they be inclosed within a boom, in order to hold them together, and these booms have heretofore been made by selecting long sticks of timber, (as long as sixty-six feet, when obtainable,) boring holes therethrough near the ends and chaining the ends together. Booms so constructed have several disadvantages. The long sticks are expensive, and they cannot be obtained of any great size, and it is evident that the greater diameter of the boom-log the less chance of the inclosed logs being thrown over the boom by the sea. When sticks are tied together in the old way they work against each other in a sea, wearing off the ends thereof, and they are very apt to give out, and thus cause the loss of all or a portion of the raft.

My invention, on the contrary, uses short boom-logs, (those which I employ are ordinarily about twelve feet in length, though they may be longer or shorter,) by which logs of greater diameter may be obtained for much less money. The boom is rendered much more flexible, and little or no strain is brought upon the logs themselves.

1, 2, and 3 represent three logs forming a portion of my improved boom, through each of which is bored longitudinally an opening, 4, so that all the logs forming the boom can be strung upon a chain, 5, which I prefer to provide with swivels 12, between each two adjacent logs, to prevent the chain from becoming twisted.

10 represents a pin, which I pass through each log at any convenient part thereof, passing through one of the links of the chain 5, so as to secure the logs in place on the chain, and held in place by nuts 11, or in any other convenient way. The ends of the boom-logs may be left in their natural state, as shown at the right end of log 2, or they may be capped with iron plates, as shown at 7, secured by spikes 9, driven into the log, or a piece of hard wood, 6, may be set in the end of each log to take the wear of the chain.

I usually place the logs far enough apart on the chain to prevent undue wear between their adjacent ends, and have shown them somewhat close together in the drawing for the purpose of economizing space.

This boom can be swept around a quantity of logs and each end fastened to a nose-piece made expressly for that purpose, or the two ends of the chain secured together and fastened to a tow-line, and the whole strain of towing will come upon the chain, and not upon the boom-logs, as heretofore.

What I claim as my invention, and desire to secure by Letters Patent, is—

1. A boom composed of short logs longitudinally bored and strung upon a chain and each separately fastened thereto, substantially as shown and described.

2. A boom composed of short logs longitudinally bored, a chain passing through the bore in said logs, swivels in said chain between said logs, and a fastening between each log and that portion of the chain running through said log, substantially as shown and described.

3. In a boom composed of short logs longitudinally bored and strung on a chain, an end piece of harder material than the log fastened in the end of the log around the bore, substantially as and for the purposes set forth.

BENJ. BOUTELL.

Witnesses:
HEZEKIAH M. LITTELL,
M. L. COURTRIGHT.